US006380538B1

(12) United States Patent
Bajic

(10) Patent No.: US 6,380,538 B1
(45) Date of Patent: Apr. 30, 2002

(54) ION SOURCE FOR A MASS ANALYSER AND METHOD OF CLEANING AN ION SOURCE

(75) Inventor: Stevan Bajic, Sale (GB)

(73) Assignee: Masslab Limited (GB)

( * ) Notice: Subject to any disclaimer, the term of this patent is extended or adjusted under 35 U.S.C. 154(b) by 0 days.

(21) Appl. No.: 09/269,803

(22) PCT Filed: Aug. 6, 1998

(86) PCT No.: PCT/GB98/02359

§ 371 Date: Jun. 21, 1999

§ 102(e) Date: Jun. 21, 1999

(87) PCT Pub. No.: WO99/08309

PCT Pub. Date: Feb. 18, 1999

(30) Foreign Application Priority Data

Aug. 6, 1997 (GB) .......................................... 9716666

(51) Int. Cl.$^{7}$ ......................... B01D 59/44; H01J 49/00; G05N 30/02

(52) U.S. Cl. ....................... 250/288; 250/281; 436/161

(58) Field of Search ............................... 250/288, 281; 436/161

(56) References Cited

U.S. PATENT DOCUMENTS

| | | | |
|---|---|---|---|
| 4,023,398 A | 5/1977 | French et al. | 73/23 |
| 5,229,605 A | 7/1993 | Bridenne et al. | 250/282 |
| 5,432,343 A | 7/1995 | Gulcicek et al. | |
| 5,481,107 A | 1/1996 | Takada et al. | |

FOREIGN PATENT DOCUMENTS

| | | | | |
|---|---|---|---|---|
| DE | 3913763 A1 | | 11/1989 | |
| GB | 2256523 A | | 12/1992 | |
| GB | 2308227 A | | 6/1997 | |
| JP | 60241634 | | 11/1985 | |
| JP | 61095244 A | * | 5/1986 | 436/161 |
| JP | 06-310090 A | * | 11/1994 | H01J/49/10 |
| WO | WO 95/24259 | | 9/1995 | |
| WO | WO 98/11595 | | 3/1998 | |

OTHER PUBLICATIONS

International Search Report dated Oct. 1, 1997.

* cited by examiner

*Primary Examiner*—Jack Berman
*Assistant Examiner*—Kalimah Fernandez
(74) *Attorney, Agent, or Firm*—Haynes and Boone, LLP

(57) ABSTRACT

An ion source for a low pressure mass spectrometer has an atmospheric pressure sample ioniser operative at relatively higher pressure to provide a sample flow containing desired sample ions to the mass spectrometer via an inlet orifice. The sample flow invariably contains involatile components that are infused either as chromatographic buffers or which appear in the analyte as sample extraction byproducts. As the sample ions pass from the high pressure to the low pressure regions through the orifice, these involatile components are deposited on the peripheral regions of the inlet orifice. A conduit for the transportation of a cleaning fluid has an opening adjacent to the inlet orifice for dispensing the cleaning fluid onto at least a portion of a surface of the orifice member during operation of the ion source.

27 Claims, 4 Drawing Sheets

FIG. 4.
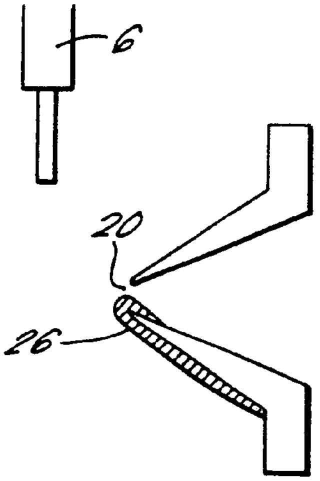
FIG. 5.
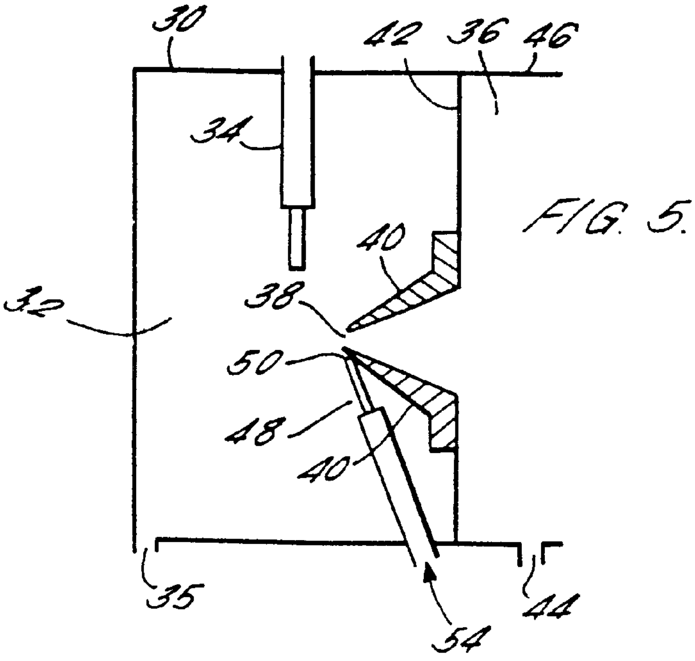
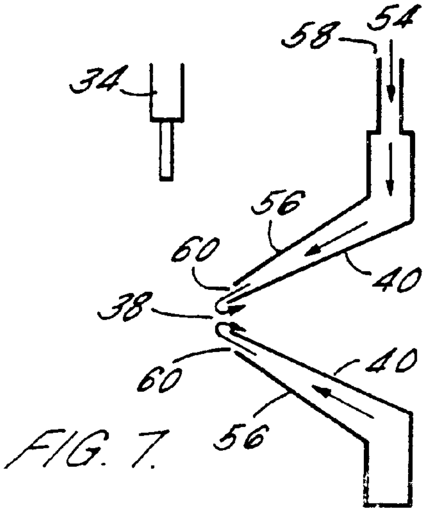
FIG. 7.

ION SOURCE FOR A MASS ANALYSER AND METHOD OF CLEANING AN ION SOURCE

FIELD OF THE INVENTION

The invention relates to an ion source for a mass spectrometer and to a method of cleaning an ion source. Mass spectrometers normally operate at low pressure and the present invention is particularly concerned with an ion source which operates at atmospheric pressure. Such ion sources include electrospray ionisation (ESI) sources and atmospheric pressure chemical ionisation (APCI) sources.

BACKGROUND OF THE INVENTION

Mass spectrometers have been used to analyse a wide range of materials, including organic substances, such as pharmaceutical compounds, environmental compounds and biomolecules. For mass analysis, it is necessary to produce ions of such sample compounds and biomolecules. Of particular use in the study of biological substances are mass spectrometers which have ion sources for creating ions of the sample compounds, where such ion sources operate at atmospheric pressure, or at least a pressure substantially higher than that of the mass spectrometer.

All atmospheric pressure ionisation (API) sources for mass spectrometers include an ion inlet orifice that forms a boundary between the API region and the low pressure region of the source or mass analyser.

This orifice is generally small (typically less than 0.5 mm in diameter) owing to the need to maintain a low pressure in the mass analyser region (typically less than $10^{-4}$ mBar) and the finite pumping speed of the vacuum system used to maintain this low pressure.

The liquid chromatography (LC) inlet systems frequently used with these sources, e.g. APCI or electrospray probes, produce an aerosol in the atmospheric pressure region which, in addition to the gaseous sample ions, invariably contains involatile components that are infused either as chromatographic buffers or which appear in the analyte as sample extraction by-products.

As the sample ions pass from the high pressure region to the low pressure region through the orifice, these involatile components are deposited on the peripheral regions of the ion inlet orifice. Over prolonged periods of mass spectral analysis, this may eventually lead to a partial or complete blockage of the orifice and concomitant loss in sensitivity of the mass spectrometer with time.

Prior art API sources have utilised two alternative designs for the purpose of preventing the ion inlet orifice from being blocked due to the deposition of involatile substances, either a 'sacrificial' counterelectrode or an orthogonal source geometry.

FIG. 1 shows a typical counter electrode design. Here, the purpose of the counter electrode 2 is to present a surface 4 (a 'sacrificial' surface) for collecting excess involatile components which are within the aerosol produced by the probe 6. The gas flow (containing the ions and residual involatiles) is then redirected away from the direct line-of-sight of the orifice 20 to prevent the residual involatiles passing through the orifice 20 into the mass analyser 10 via the low pressure region 12 (which is maintained at a low pressure by pumps 8). However, over prolonged periods of use with strong chromatographic buffers (e.g. 50 mM sodium phosphate), these sources tend to lose sensitivity due to blockage of either the orifice 20 or the counter electrode 2 itself.

FIG. 2 shows a typical prior art orthogonal electrospray source design. The primary objective of this source geometry is to direct the spray away from the inlet orifice. However, at the higher flow rates used in LC mass spectroscopy (typically 1 ml/min), both the ions 22 and the charged liquid droplets 24 (containing involatile components) are deflected by the electric field towards the inlet orifice 20. This effect (which eventually leads to a blocked orifice) is shown schematically in FIG. 3*a*.

A partial solution to this problem is effected by extending the position of the probe tip 6 towards the inlet orifice 20 as shown in FIG. 3*b*. In this case, the highly mobile ions 22 are still focused by the electric field into the orifice 20 whilst the high momentum liquid droplets 24 are deposited further downstream of the orifice.

Similarly, FIG. 3*c* shows a further improvement in source robustness obtained by reducing the electrospray potential, and hence the electric field between the probe and the orifice, which also has the effect of directing the large liquid droplets 24 away from the orifice 20.

However, these latter two improvements to the orthogonal geometry also lead to a significant reduction in sensitivity of the source.

A close inspection of the inlet orifice of an orthogonal geometry API source generally reveals that the majority of involatile components are deposited on the downstream cone surface and the downstream periphery of the orifice itself. This is shown schematically in FIG. 4. If the probe tip 6 is located to the upper left of the inlet orifice 20, then it is found that orifice blockage occurs due to crystallisation of involatile chromatographic buffers 26 on the lower edge of the orifice 20 and subsequent crystal growth upwards from this lower edge of the orifice 20.

SUMMARY OF THE INVENTION

The present invention aims to address the prior art problems of the deposition of involatiles and the resulting blockage of the orifice.

In one aspect, the present invention provides an ion source for a low pressure mass spectrometer comprising an atmospheric pressure sample ioniser operative at relatively higher pressure to provide a sample flow containing desired sample ions entrained with undesired gas and droplets, an orifice member defining an inlet orifice between the sample ioniser and the mass spectrometer, a conduit to transport a cleaning fluid, and a cleaning fluid reservoir suitable for connection to the conduit, the conduit having an opening adjacent the inlet orifice of the orifice member to dispense the cleaning fluid onto at least a portion of a surface of the orifice member during operation of the ion source.

Preferably the atmospheric pressure sample ioniser is operative to form a spray directed transversely of the axis of the inlet orifice, and the conduit opening is located to dispense the cleaning fluid onto a portion of the orifice member downstream of this orifice in the spray direction.

Advantageously, the conduit can have a plurality of openings adjacent to the inlet orifice of the orifice member for dispensing the cleaning fluid, the openings being positioned such that the entire periphery of the orifice is contacted by cleaning fluid. All of the surface adjacent to the orifice can then be cleaned, so as to prevent the build up of any materials on the surface that may result in blockage of the inlet orifice.

Preferably, the opening for dispensing the cleaning fluid can extend around the entire periphery of the orifice.

Preferably the orifice member is conical and the inlet orifice is formed at the apex of the cone.

Preferably the conduit is formed by a further conical member surrounding the cone of the orifice member and forming an annular opening surrounding the inlet orifice.

In another aspect, the present invention provides a method of cleaning the orifice member of an ion source for a low pressure mass spectrometer, the ion source comprising an atmospheric pressure sample ioniser operative at relatively higher pressure to provide a sample flow containing desired sample ions entrained with undesired gas and droplets, with an orifice member defining an inlet orifice between the sample ioniser and the mass spectrometer; the method comprising dispensing a cleaning fluid onto at least a portion of a surface of the orifice member adjacent the inlet orifice during the operation of the ion source.

Advantageously, the cleaning fluid can be continuously dispensed during operation of the ion source in order to prevent an accumulation of any substances that are deposited on the surface of the orifice member.

Preferably the cleaning fluid is dispensed on the surface of the orifice member on the higher pressure side thereof.

Advantageously the cleaning fluid can be dispensed so close to the inlet orifice that at least some of the dispensed cleaning fluid passes into the inlet orifice. This prevents the accumulation of any deposited involatile substances within the inlet orifice.

Advantageously, the cleaning fluid is dispensed around the entire periphery of the orifice.

Advantageously, the cleaning fluid is a solvent for the involatile components of the sample spray.

BRIEF DESCRIPTION OF THE DRAWINGS

Preferred examples of the invention will now be described with reference to the figures, wherein:

FIG. 4 is a schematic diagram showing how solid deposition typically occurs on the ion source of FIG. 2, FIG. 5 is a schematic diagram of an ion source embodying the present invention, FIG. 7 is a schematic diagram of an ion source in accordance with a second embodiment of the present invention.

DETAILED DESCRIPTION OF THE PREFERRED EMBODIMENTS

Figure 1:
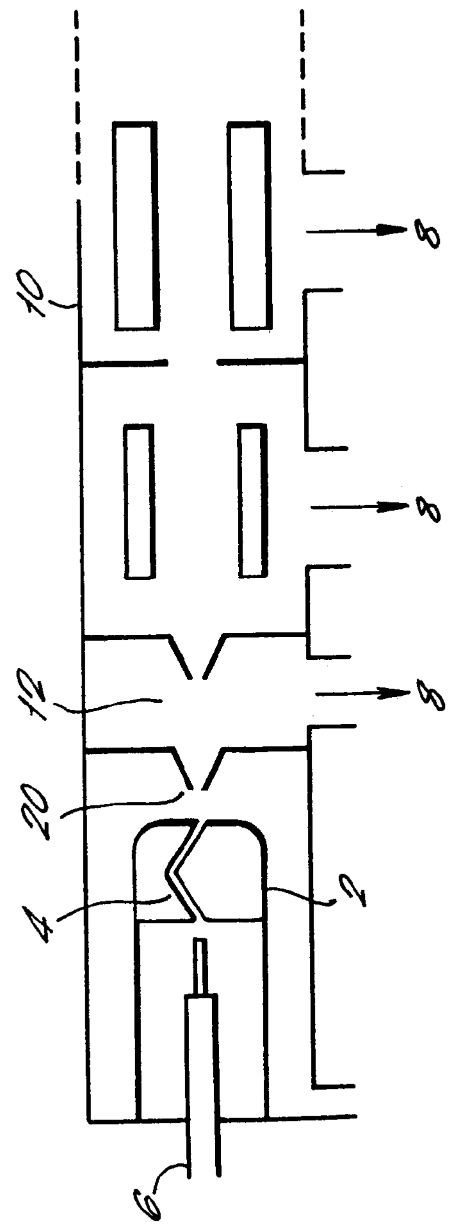
FIG. 1. PRIOR ART
FIG. 1 is a schematic diagram of a prior art ion source and mass spectrometer of the 'sacrificial' counterelectrode type.
Figure 2:
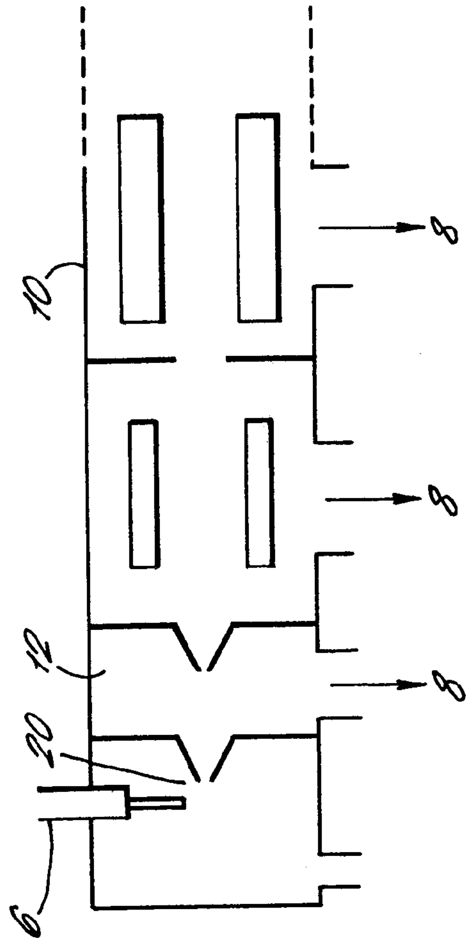
FIG. 2. PRIOR ART
FIG. 2 is a schematic diagram of a prior art ion source and mass spectrometer of the orthogonal geometry type.
Figure 3A:
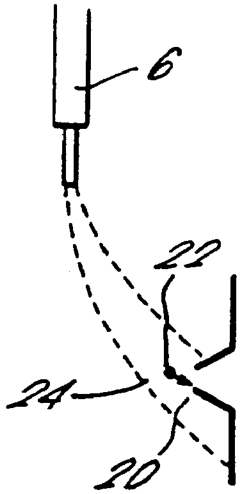
FIGS. 3*a*, 3*b* and 3*c* are schematic diagrams of prior art variations of the ion source shown in FIG. 2.
Figure 3B:
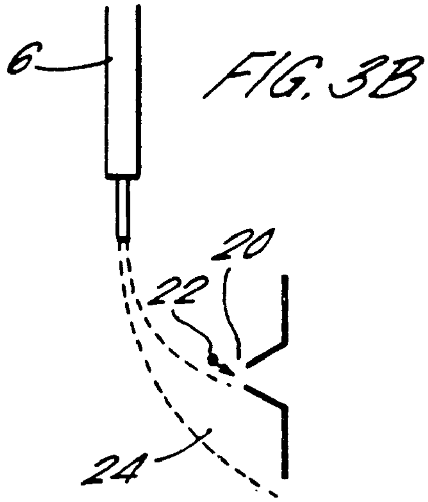
Figure 3C:
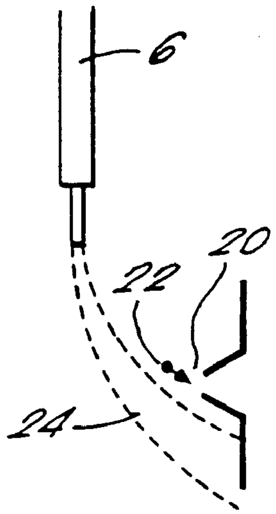

In FIG. 5, an ion source 30 includes an ionisation region 32 which contains a probe 34 (which may be an ESI or an APCI probe including a probe heater) arranged to produce ionised sample droplets.

The ionisation region, 32 is maintained at atmospheric pressure by an atmospheric pressure vent 35. The relatively high pressure region of the ionisation region 32 is in communication with the lower pressure region 36 of the mass analyser 46 via an inlet orifice 38. The inlet orifice 38 is positioned within an orifice member 40, which is positioned within a partition 42 between the two differing pressure regions. In this example the orifice member 40 is conical.

The lower pressure region 36 is evacuated via a port 44 by a conventional vacuum pump to a pressure of typically 15 mBar. The sample flow, which includes gaseous sample ions as well as involatile components, passes through the inlet orifice to the low pressure region 36, and then into other regions of the mass analyser 46 for analysis. Frequently, some of the involatile components of the sample will also be deposited on the peripheral regions of the inlet orifice 38.

A feeder line 48, which in this example is composed of fused silica, is positioned within the ionisation region 32, with an opening 50 adjacent to the orifice member 40. The other end of the feeder line is connected to a cleaning fluid reservoir (not shown).

As seen in FIG. 5, the opening 50 of the feeder line 48 is positioned next to the inlet orifice 38, so as to dispense the cleaning fluid 54 downstream of the orifice 38 in the sample spray direction. As is shown in FIG. 4, this is the most likely region for the involatiles to be deposited upon.

During the operation of the ioniser, cleaning fluid 54 is pumped from the cleaning fluid reservoir along the feeder line 48 and dispensed from the opening 50 onto the orifice member 40. The cleaning fluid is dispensed onto the orifice member 40 at the point of deposition of the involatile components of the sample, acting to rinse off these components and so preventing a build up of the involatile components which typically results in the inlet orifice being blocked. In this example, the cleaning fluid is chosen to be a solvent for the involatile components of the sample.

The problem of orifice blocking is thus eliminated in the present example by the inclusion of a constant flow of solvent at the point of initial deposition of involatile substances.

In this example, the solvent is deposited from the feed line so that the cleaning fluid then flows towards and over the orifice edge, i.e. into the orifice, as a result of the pressure difference across the inlet orifice. The constant flow of liquid over the edge of the orifice has been show by trials to have no detrimental effect on the focusing of ions from atmospheric pressure into the lower pressure region immediately behind the inlet orifice.

This technique has been shown to dramatically improve the robustness of an orthogonal electrospray source during a prolonged period of operation with a mobile phase consisting of 50% acetonitrile and 50% aqueous 50 mM sodium phosphate (involatile chromatographic buffer) at a total flow rate of 0.5 ml/min. In this case, HPLC grade water was pumped through the fused silica feeder line at a flow of 40 $\mu$l/min.

Figure 6:
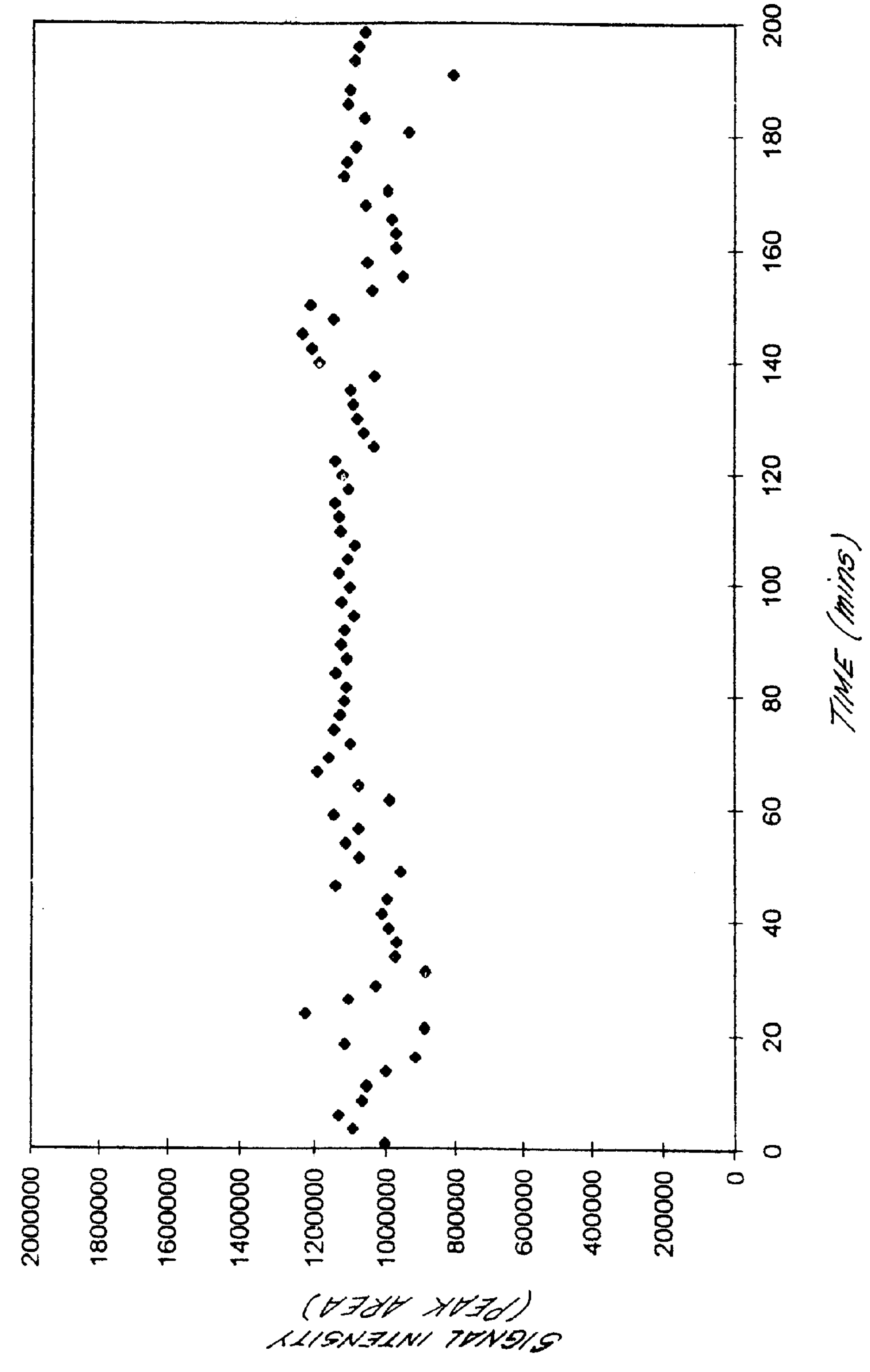
FIG. 6 is a diagram of the experimental results obtained using the ion source shown in FIG. 5.

FIG. 6 shows the variation in signal intensity (peak area) obtained from an electrospray source for repeat injections of 1 ng of procainamide using the above conditions. This demonstrates that there is no significant decrease in the average signal over a period of operation greater than three hours. In the absence of the 40 $\mu$l/min conduit flow, the signal typically decreases to 50% of its original value after approximately 30 minutes. Following 200 minutes of operation using the conduit flow, a visual inspection revealed a complete absence of sodium phosphate or any other substance in the immediate vicinity of the orifice.

Instead of using a single orifice, a number of lines may be arranged to completely surround the orifice and hence prevent the possibility of involatile deposition on the upstream edge or other locations on the orifice.

FIG. 7 shows an alternative arrangement providing a radial flow over 360 degrees of the orifice 38. The conduit here comprises a further conical member 56 surrounding the conical orifice member 40, forming a conical flow path between the two. Liquid from the reservoir is supplied to an inlet 58 to said conical flow path. The outer conical member 56 provides an annular flow opening 60 surrounding the orifice 38.

The choice of conduit liquid is not limited to water. A mixture of liquids could be chosen to give the greatest solubility for the expected or unknown involatiles that may be present in the mobile phase.

It is anticipated that orifice flow rates in the range 10 μl/min to 1 ml/min would be feasible, although the latter would place a higher solvent load on the intermediate source vacuum pump and increase the probability of forming undesirable solvent adducts.

A stand-alone pump could be used to deliver the orifice flow solvent to the orifice. Alternatively, lower orifice flow rates could be delivered using a nitrogen pressurised liquid bottle directly attached to the fused silica line shown in FIG. 5.

Of course, the present invention is not limited to supplying a constant flow of cleaning fluid during the operation of the ion source. The cleaning fluid could be delivered in periodic bursts of appropriate duration and intensity relevant to the constituents of the ionised sample.

What is claimed is:

1. An apparatus for use in mass analysis, the apparatus comprising an ion source for a low pressure mass spectrometer operative at a first pressure, the ion source comprising an atmospheric pressure sample ioniser operative at a second pressure which is higher than the said first pressure at which the mass spectrometer operates, the ioniser being arranged to provide a sample flow containing desired sample ions entrained with undesired gas and droplets, an orifice member defining an inlet orifice between the sample ioniser and the mass spectrometer, a conduit to transport a cleaning fluid, and a cleaning fluid reservoir connectable to the conduit, said conduit having at least one opening arranged immediately adjacent the inlet orifice of the orifice member to dispense the cleaning fluid directly onto at least a portion of a surface of the orifice member during operation of the ion source.

2. The apparatus as claimed in claim 1, wherein said surface of the orifice member is on the side thereof that is at the said second pressure.

3. The apparatus as claimed in claim 2, wherein said atmospheric pressure sample ioniser is operative to form a spray directed transversely of the axis of the inlet orifice, and said conduit opening being located to dispense the cleaning fluid onto a portion of the orifice member downstream of this orifice in the spray direction.

4. The apparatus as claimed in claim 2, wherein said opening for dispensing the cleaning fluid extends around the entire periphery of the orifice.

5. The apparatus as claimed of claim 2, wherein the orifice member is conical and the inlet orifice is formed at the apex of the cone.

6. The apparatus as claimed in claim 5, wherein the conduit is formed by a further conical member surrounding the cone of the orifice member and forming an annular opening surrounding said inlet orifice.

7. A method of cleaning an orifice member of an ion source for a low pressure mass spectrometer operative at a first pressure, the method comprising providing said ion source, said ion source operable to provide a sample flow with the orifice member defining an inlet orifice between an atmospheric pressure sample ioniser operative at a second pressure which is higher than the said first pressure at which the mass spectrometer operates, the flow containing desired sample ions entrained with undesired gas and droplets, and dispensing a cleaning fluid directly onto at least a portion of a surface of the orifice member arranged immediately adjacent the inlet orifice during the operation of the ion source.

8. A method of cleaning as claimed in claim 7, wherein the fluid is dispensed on said surface of the orifice member on the side thereof that is at the said second pressure.

9. A method of cleaning as claimed in claim 8, wherein the fluid is dispensed close to the inlet orifice so that at least some of the dispensed cleaning fluid passes into the inlet orifice.

10. A method of cleaning as claimed in claim 7, wherein the cleaning fluid is dispensed around the entire periphery of the orifice.

11. A method of cleaning part of an ion source as claimed in claim 7, wherein the cleaning fluid is a solvent for the involatile components of the sample spray.

12. An apparatus for use in mass analysis, the apparatus comprising an ion source for a low pressure mass spectrometer operative at a first pressure, the ion source comprising an atmospheric pressure sample ioniser operative at a second pressure which is higher than the said first pressure at which the mass spectrometer operates, the ioniser being arranged to provide a sample flow containing desired sample ions entrained with undesired gas and droplets, an orifice member defining an inlet orifice between the sample ioniser and the mass spectrometer, a conduit to transport a cleaning fluid, and a cleaning fluid reservoir connectable to the conduit, said conduit having at least one opening arranged adjacent the inlet orifice of the orifice member to continually dispense the cleaning fluid onto at least a portion of a surface of the orifice member during operation of the ion source.

13. The apparatus of claim 12, wherein the cleaning fluid is continuously dispensed by a continuous flow of cleaning fluid.

14. The apparatus of claim 12, wherein the cleaning fluid is continually dispensed by using a continuous series of discrete bursts of cleaning fluid.

15. The apparatus as claimed in claim 12, wherein said surface of the orifice member is on the side thereof that is at the said second pressure.

16. The apparatus as claimed in claim 15, wherein said atmospheric pressure sample ioniser is operative to form a spray directed transversely of the axis of the inlet orifice, and said conduit opening being located to dispense the cleaning fluid onto a portion of the orifice member downstream of this orifice in the spray direction.

17. The apparatus as claimed in claim 15, wherein the conduit opening is arranged to dispense the cleaning fluid immediately adjacent said orifice such that some of said cleaning fluid passes into the orifice.

18. The apparatus as claimed in claim 15, wherein said opening for dispensing the cleaning fluid extends around the entire periphery of the orifice.

19. The apparatus as claimed in claim 15, wherein the orifice member is conical and the inlet orifice is formed at the apex of the cone.

20. The apparatus as claimed in claim 19 wherein the conduit is formed by a further conical member surrounding the cone of the orifice member and forming an annular opening surrounding said inlet orifice.

21. A method of cleaning an orifice member of an ion source for a low pressure mass spectrometer operative at a first pressure, the method comprising providing said ion source, said ion source comprising an atmospheric pressure sample ioniser operative at a second pressure which is higher than the said first pressure at which the mass spectrometer operates, the ioniser being arranged to provide a sample flow containing desired sample ions entrained with undesired gas and droplets, with an orifice member defining an inlet orifice between the sample ioniser and the mass spectrometer; and continuously dispensing a cleaning fluid onto at least a portion of a surface of the orifice member adjacent the inlet orifice during the operation of the ion source.

22. The method of cleaning as claimed in claim 21, wherein cleaning fluid is continuously dispensed by using a continuous flow of cleaning fluid during operation of the ion source.

23. The method of cleaning as claimed in claim 21, wherein cleaning fluid is continuously dispensed by using a continuous series of discrete bursts of cleaning fluid during operation of the ion source.

24. The method of cleaning as claimed in claim 21, wherein the fluid is dispensed on said surface of the orifice member on the side thereof that is at the said second pressure.

25. The method of cleaning as claimed in claim 24, wherein the fluid is dispensed close to the inlet orifice so that at least some of the dispensed cleaning fluid passes into the inlet orifice.

26. The method of cleaning as claimed in claim 21, wherein the cleaning fluid is dispensed around the entire periphery of the orifice.

27. The method of cleaning part of an ion source as claimed in claim 21, wherein the cleaning fluid is a solvent for the involatile components of the sample spray.

* * * * *